United States Patent [19]

Sato

[11] Patent Number: 5,009,402
[45] Date of Patent: Apr. 23, 1991

[54] VEHICLE ENGINE AND SUSPENSION VIBRATION CONTROL ARRANGEMENT

[75] Inventor: Shigeki Sato, Yokosuka, Japan
[73] Assignee: Nissan Motor Co., Ltd., Japan
[21] Appl. No.: 367,682
[22] Filed: Jun. 19, 1989

[30] Foreign Application Priority Data

Jun. 21, 1988 [JP] Japan .............................. 63-152655

[51] Int. Cl.⁵ .............................................. F16F 5/00
[52] U.S. Cl. .................................. 267/140.1; 267/219
[58] Field of Search ............... 188/267, 299; 248/562, 248/566; 267/140.1, 218, 219; 280/707

[56] References Cited

U.S. PATENT DOCUMENTS

| | | | |
|---|---|---|---|
| 3,599,428 | 8/1971 | Chaney et al. | 60/52 R |
| 4,665,440 | 4/1987 | Eckert | 188/299 X |
| 4,671,227 | 6/1987 | Hollerweger et al. | 123/192 R |
| 4,720,087 | 1/1988 | Duclos et al. | 267/140.1 |
| 4,742,998 | 5/1988 | Schubert | 267/136 |
| 4,754,956 | 7/1988 | Barone et al. | 267/219 X |
| 4,757,981 | 7/1988 | Härtel | 267/140.1 AE |
| 4,759,534 | 7/1988 | Hartel | 267/140.1 |
| 4,773,632 | 9/1988 | Hartel | 267/140.1 |
| 4,778,158 | 10/1988 | Hoying et al. | 267/140.1 AE |

FOREIGN PATENT DOCUMENTS

| | | |
|---|---|---|
| 60-104828 | 7/1985 | Japan . |
| 61-74930 | 4/1986 | Japan . |
| 0176840 | 7/1988 | Japan ............ 267/219 |

OTHER PUBLICATIONS

Scientific American, Sep., 1988, p. 22.
Nissan Service Manual for U12, pp. C-55, C-56.
SAE Report #870963, An Externally Tunable Hydraulic Mount which uses Electro-Rheological Fluid, Theodore G. Duclos, Lord Corp., pp. 131-137.

*Primary Examiner*—Duane A. Reger
*Attorney, Agent, or Firm*—Leydig, Voit & Mayer

[57] ABSTRACT

A manually operable switch can induce the shock absorbers of a vehicle suspension system to be set to produce one of plurality of different damping characteristics and further induce one of a plurality of different predetermined voltages to be applied to the electrodes in the orifice passage of one or more electrorheopatic fluid filled vibration damping mounts which support a vehicle power unit on a vehicle chassis.

5 Claims, 3 Drawing Sheets

(OFF)

(LOW)

(HIGH)

VEHICLE ENGINE AND SUSPENSION VIBRATION CONTROL ARRANGEMENT

BACKGROUND OF THE INVENTION

1. Field of the Invention

The present invention relates generally to automotive vehicles and more specifically to an arrangement which can enable the selective setting of not only the vehicle suspension but the arrangement by which the engine is supported.

2. Description of the Prior Ar

Service manual No. 558 published in September of 1987 which pertains to a so called U12 type vehicle, by Nissan Motor Corporation, discloses on pages 55, 56 of section C, a suspension arrangement wherein the shock absorbers can be selectively changed in a manner to produce three different damping levels That is to say, shock absorbers of the suspension can be set at an operator's discretion to produce soft, intermediate or hard ride characteristics.

SAE Report #870963 entitled "An Externally Tunable Hydraulic Mount Which Uses Electro-Rheological fluid" by Theodore G. Duclos, of Lord Corp. discloses a mounting arrangement which includes a so called E R F (electrorheopetic fluid) and which enables the damping characteristics to be changed by selectively applying a voltage across electrodes which are disposed in an orifice passage interconnecting a main working chamber and an auxiliary or expansion chamber.

However, even when both of these arrangements are incorporated in a single vehicle, when the variable suspension is set to hard to produce a so called "sports mode" for example, the engine suspension characteristics remain unchanged and tend to deteriorate the ride or feel which results. On the other hand, as the setting of the engine suspension members is a compromise between hard and soft characteristics, when the vehicle suspension is set to soft, the engine suspension tends to be a little on the hard side and thus again detracts from the provision of the variable vehicle suspension.

SUMMARY OF THE INVENTION

It is an object of the present invention to provide an arrangement which enables the vehicle suspension and engine suspension to be simultaneously hardened and softened in a manner which improves the feel and stability of the vehicle.

In brief, the above object is achieved by an arrangement wherein a manually operable switch can induce the shock absorbers of a vehicle suspension system to be set to produce one of plurality of different damping characteristics and further induce one of a plurality of different predetermined voltages to be applied to the electrodes in the orifice passage of one or more ERF filled vibration damping mounts which support a vehicle power unit on a vehicle chassis.

More specifically, a suspension arrangement according to the present invention for use in a vehicle having a chassis and an engine, comprises a vehicle suspension, the vehicle suspension including a shock absorber, the shock absorber including means which enables the damping characteristics thereof to be selectively varied between a plurality of different damping levels in a manner to produce a plurality of different suspension hardnesses. An engine mount supports the engine on the chassis, the engine mount including a main variable volume chamber and an auxiliary chamber which is fluidly communicated with the main chamber by an orifice passage, the main chamber and the auxiliary chamber being filled with an electrorheopetic fluid, the engine mount further including electrodes which are disposed in the orifice passage, the electrodes being arranged so that depending on the voltage which is impressed thereon, the viscosity of the electrorheopetic fluid changes, and damping characteristics of the mount are varied. A source of voltage is electrically connected with the electrodes and arranged to selectively apply one of a plurality of different voltages thereto. A manually operable switch has a plurality of settings and is operatively connected with the shock absorber and the source of voltage. The switch is arranged so that when it is set to a state which induces the shock absorber to produce a given damping level, a voltage is applied to the electrodes by the source of voltage in manner such that the damping characteristics of the engine mount are induced to match those produced by the shock absorber for the instant switch setting.

DETAILED DESCRIPTION OF THE PREFERRED EMBODIMENTS

Figure 1:
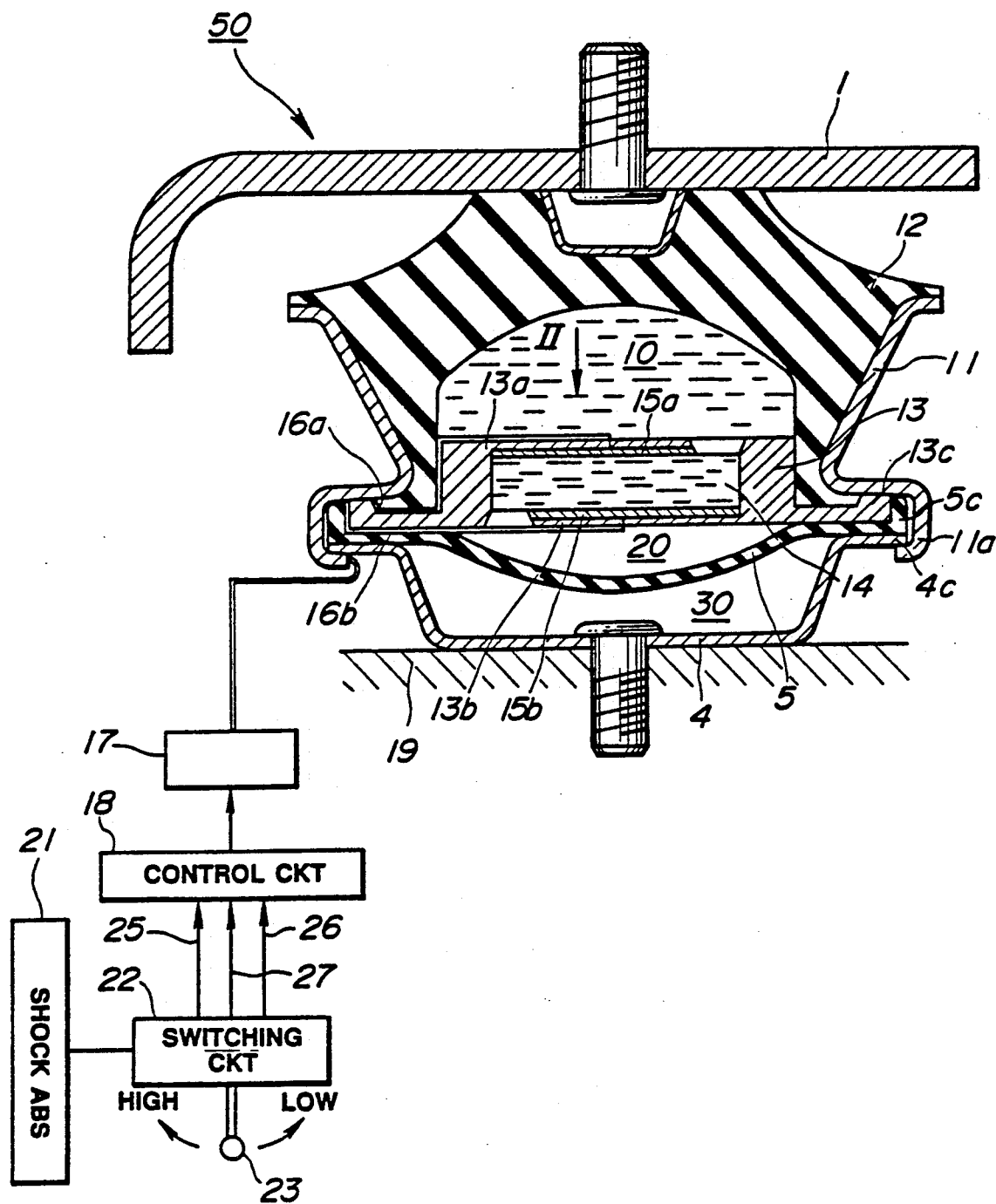
FIG. 1 is a sectional elevation showing the structure of an embodiment of the present invention.

FIG. 1 shows in cross-sectional elevation an engine mount arrangement (generally denoted by the numeral 50) according to an embodiment of the present invention. In this instance the device is operatively disposed between a first bracket or connection structure 1 which is arranged to be connected to the engine via a bolt (no numeral), and a second structure 19 which is connected to or forms part of a vehicle chassis.

The mount 50 per se, in this instance, comprises an elastomeric body 12 which acts as a spring, and a rigid housing. The upper portion of the elastomeric body 12 (as seen in the drawings) is fixedly connected (e.g. vulcanized) to the lower surface of the bracket 1 while the lower portion thereof is vulcanized to the inner periphery of a first frusto-conical member 11 which defines an upper half of the rigid housing. A second cup-like member 4 which defines the lower half of the housing, is detachably connected to the structure 19 by a bolt (no numeral).

An orifice plate 13 and a flexible elastomeric diaphragm 5 are sandwiched between the first and second halves 11, 4 of the rigid housing in a manner to define a main working chamber 10 (between the orifice plate 13 and the elastomeric body 12) and an auxiliary expansion chamber 20 (between the orifice plate 13 and the diaphragm 5). These chambers are filled with an electrorheopectic fluid, or ERF as it will be referred to hereinafter. As is well known, this type of fluid undergoes a sharp increase in viscosity when exposed to an electric field such as generated between two adjacent electrodes when a suitable voltage is impressed thereacross.

An air chamber 30 is defined in the second lower half 4 of the housing by the diaphragm 5.

The orifice plate 13 is formed with a radially extending flange which is provided with an annular lip portion 13c. This lip engages the lower face of a radially extending portion of the upper half 11 of the rigid housing. The peripheral edge 5c of the diaphragm is wrapped up about the peripheral edge of the orifice plate 13 and the lower edge of the upper half 11 of the rigid housing is bent around the peripheral edges of the orifice plate and the diaphragm and arranged to engage a radially extending flange portion of the lower half 4 of the housing with sufficient force as to produce a hermetically seal which retains the ERF within the main and auxiliary chambers 10, 20 of the mount 10.

Figure 2:
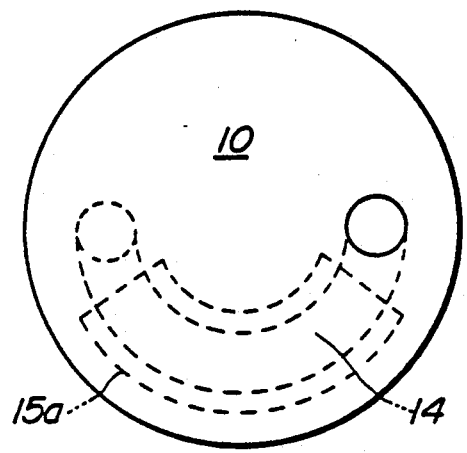
FIG. 2 is a view as seen in the direction of arrow II (FIG. 1) showing the shape of an orifice passage and electrode plates of an orifice plate of the present invention.

The orifice plate 13 is made of an electrically insulating material and formed with an arcuate orifice passage 14 which leads from the main working chamber 10 to the auxiliary one 20 (see FIG. 2). First and second electrically conductive arcuate plates 15a and 15b are disposed in the orifice passage 14 so as to oppose one another. These plates 15a, 15b are connected by way of lead lines 16a and 16b to a power supply circuit 17 (e.g. amplifier, transformer or the like) and act as electrodes across which a voltage can be impressed.

A variable damping shock absorber 21 which forms part of a vehicle suspension is disposed between the sprung and unsprung portions thereof and damps vibration in a known manner. In this instance the shock absorber can be adjusted to produce three different levels of vibration damping, i.e., high, intermediate and low. A switching circuit 22 is operatively connected with the shock absorber and provided with a lever 23 (merely by way of example) by which the required damping level can be set to vary the suspension between hard and soft modes of operation.

A control circuit 18 is arranged to receive signals indicative of the high, low and intermediate selections over lines 25, 26 and 27 respectively.

As the construction and arrangement of shock absorbers which can produce the above mentioned three different damping levels are know a detailed description of the same will be omitted for brevity.

When the vehicle is running the power unit (engine and transmission unit) produces vibrations which are applied to the engine mount. The elastomeric body undergoes flexure and thus attenuates some of the vibrations while changes in volume of the main chamber 10 due to the distortions of the elastomeric body tend to pump the ERF back and forth between the main and auxiliary chambers 10, 20 via the orifice passage 5. This pumping action of course further promotes attenuation of the vibration which tends to be transmitted through the mount to the vehicle chassis.

Depending on the level of the voltage which is impressed across the electrodes 15a and 15b the viscosity of the ERF varies and thus varies the throttling effect of the passage 14. In other words the orifice effect can be varied by impressing a voltage across said electrodes.

Figure 3A:
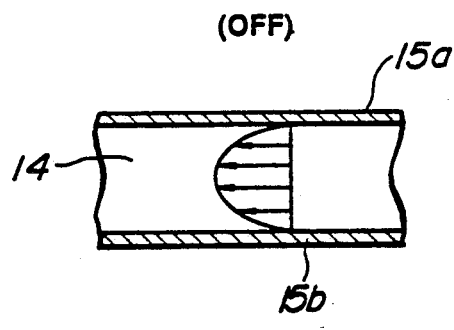
FIGS. 3A to 3C are views which show the effect of three different voltages on the flow of fluid in the orifice passage which interconnects the main and auxiliary chambers of the present invention.
Figure 3B:
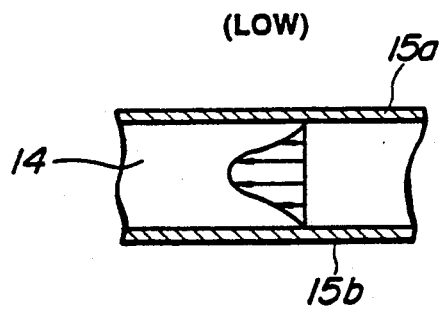
Figure 3C:
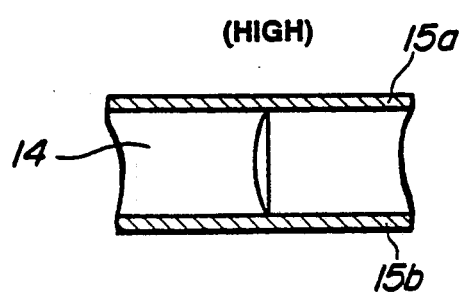

FIGS. 3A, 3B and 3C show the theoretical effect on the flow distribution in the orifice passage 14 produced by applying no voltage, an intermediate voltage and a high voltage respectively across the electrodes 15a and 15b. As will be noted, when a low voltage is applied, the ERF in close proximity of the electrodes undergoes an increase in viscosity while the fluid in the center of the passage remains essentially unchanged. Accordingly, communication between the main and auxiliary chambers is restricted as compared with the situation wherein no voltage is applied. On the other hand, when a high voltage is impressed, essentially all of the ERF in the passage undergoes an increase in viscosity and the results shown in FIG. 3C are realized.

Accordingly, it is possible to vary the damping characteristics of the engine mount in a manner to produce high, low and intermediate damping characteristics.

Depending on the setting of the lever 23 the damping characteristics of the shock absorber 21 are selectively variable between high, intermediate and low damping. At the same time a signal is sent to the control circuit 18 from the switching circuit 22. In response to this signal the power supply circuit 17 is induced to output the appropriate voltage to the electrodes 15a, 15b via lead lines 16a and 16b.

For example, in the event that a soft ride is required and the lever 23 is set to low, the voltage which is applied to the electrodes 15a and 15b is reduced to either zero or a low level. Under these conditions the ERF can flow in a relatively unrestricted manner back and forth through the orifice passage 14 and the amount of fluid which is displaced back and forth between the main and auxiliary chambers 10, 20 is not reduced. Accordingly, the dynamic spring constant of the mount 10 is reduced and the amount of vibration which is transmitted through the device attenuated.

On the other hand, if a sports mode is required and the lever 23 is set to induce the shock absorber 21 to produce hard suspension characteristics, the control circuit 18 receives a signal over line 27 and the power supply circuit 17 is arranged to apply a high voltage to the electrodes 15a and 15b. As a result all of the ERF in the orifice passage is subject to an increase in viscosity and the amount of fluid which can be pumped back and forth between the main and auxiliary chambers is reduced to essentially zero.

In the event that the lever is set to produce intermediate damping characteristics, the shock absorber 21 is conditioned to produce a damping level which is intermediate of the hard and soft ones while the control circuit 18 is induced to output a signal to the circuit 17 which induces the latter to produce an intermediate level voltage, i.e., a voltage which produces the effect depicted in FIG. 3B.

When the engine is idling, the voltage which is applied to the electrodes 15a and 15b is reduced to zero irrespective of the setting of the lever 23 as the vibrations which are produced under such conditions are inevitably of large amplitude and low frequency and therefore such as to require a relatively large amount of fluid to be pumped back and forth between the main and auxiliary chambers 10, 20.

Figure 4:
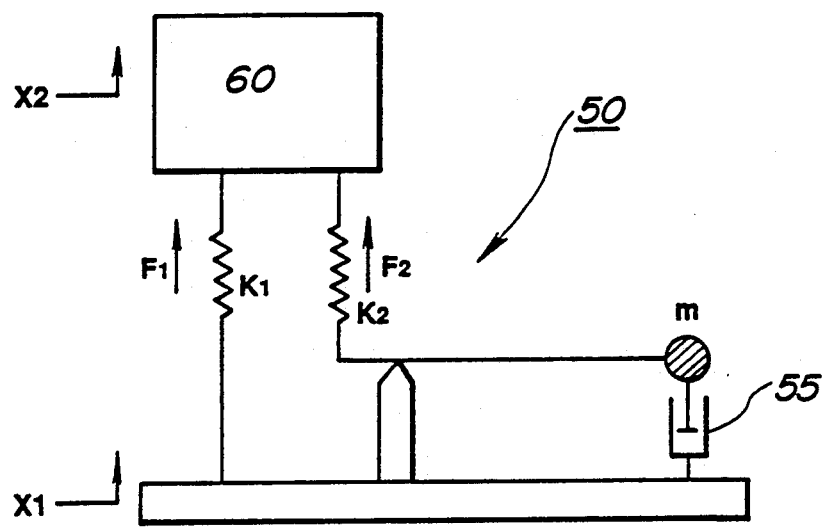
FIG. 4 is a model of the arrangement of the engine mount according to the present invention.

FIG. 4 shows a model of the engine mount arrangement 50 In this model m denotes the mass of the slug of ERF in the orifice passage, K1 denotes the spring constant of the elastomeric body 12, K2 denotes the expansion spring characteristics, 60 denotes the power unit, and X1 and X2 denote the displacements of chassis and the engine.

When no voltage is impressed across the electrodes 15a and 15b the mount exhibits a small damping force and the vibration transmission characteristics F1 which result from X1 and X2, and only the dynamic spring constant K1 need be considered.

On the other hand, when a voltage is applied across the electrodes 15a and 15b the ERF in the orifice passage "sticks" and the engine mount exhibits high damping characteristics wherein the dynamic spring constant which results from X 1 and X2 becomes K1+K2.

Figure 5:
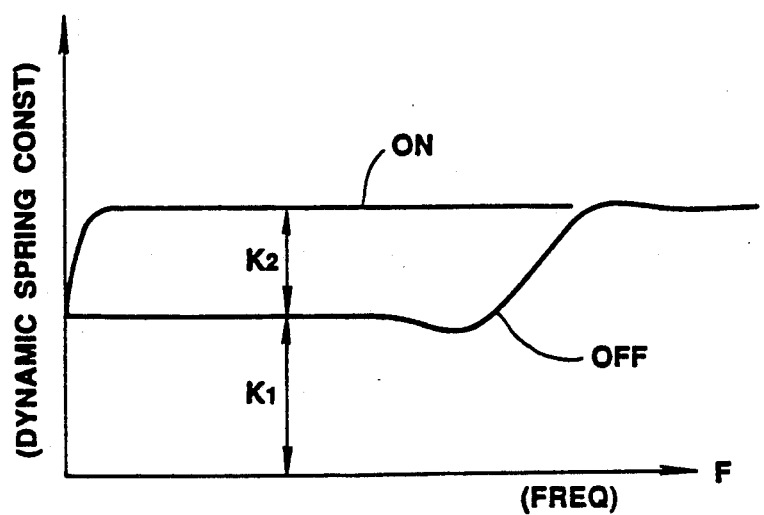
FIG. 5 is a graph showing the relationship between the vibration frequency and the spring characteristics which occur with the present invention

FIG. 5 shows graphically in terms of dynamic spring constant and frequency the characteristics mentioned above.

What is claimed is:

1. A suspension arrangement for use in a vehicle having a chassis and an engine, comprising:
    a vehicle suspension comprising a shock absorber including damping control means for selectively varying the damping characteristics of the shock absorber between a plurality of different damping levels to produce a plurality of different suspension hardnesses;
    an engine mount which supports the engine on said chassis, said engine mount including a variable-volume main chamber, an orifice passage, an auxiliary chamber which is fluidly connected with the main chamber by said orifice passage, an electrorheopetic fluid filling said main chamber and said auxiliary chamber, and electrodes disposed in said orifice passage such that changes in a voltage impressed upon said electrodes changes the viscosity of the electrorheopetic fluid and the damping characteristics of the mount;
    a source of voltage electrically connected with said electrodes for selectively applying one of a plurality of different voltages to said electrodes;
    a manually operable switch having a plurality of settings and operatively connected with said damping control means of said shock absorber for switching the damping characteristics of said shock absorber; and
    a controller responsive to said switch for controlling the voltage applied to said electrodes by said source of voltage so that when said switch is set to a setting which induces said shock absorber to produce a given damping level, a voltage is applied to said electrodes by said source of voltage such that the damping characteristics of the engine mount are induced to match those produced by the shock absorber for the instant switch setting.

2. A suspension arrangement as claimed in claim 1 wherein:
    said plurality of voltages applied by said voltage source includes a first voltage not equal to zero volts, a second voltage not equal to zero volts and producing less damping by said engine mount than said first voltage when applied to said electrodes, and a third voltage equal to zero volts; and
    said controller comprises means for setting the voltage of said source of voltage to either said second voltage or said third voltage when the engine is idling, irrespective of the setting of said switch.

3. A suspension arrangement as claimed in claim 1, wherein said engine mount further comprises:
    an elastomeric member;
    a rigid housing including a frusto-conical portion having a mouth and an inner periphery, and a cup-shaped portion fixedly connected to the frusto-conical portion, said elastomeric member being disposed in the mouth of said frusto-conical portion and fixedly connected to the inner periphery thereof;
    a partition plate disposed in said rigid housing and partitioning the housing into first and second portions, the first portion being closed by said elastomeric member to define said main chamber; and
    a flexible diaphragm partitioning the second portion into said auxiliary chamber and an air chamber, said flexible diaphragm and said partition plate being sandwiched together at peripheral portions thereof between said frusto-conical portion and said cup-shaped portion of said rigid housing,
    wherein said orifice passage comprises an arcuate passage within said partition plate, and said electrodes comprise first and second arcuate plates disposed opposite one another in said arcuate passage.

4. A suspension arrangement as claimed in claim 3 wherein each of the arcuate plates is flat.

5. A suspension arrangement for a vehicle having a chassis and an engine comprising:
    a manual switch having a plurality of settings for indicating the suspension hardness desired by a driver of the vehicle;
    a vehicle suspension having a variable-stiffness shock absorber responsive to the setting of the manual switch for producing a suspension stiffness corresponding to the setting of the switch;
    an engine mount supporting the engine on the chassis and including a variable-volume main chamber, an auxiliary chamber, an orifice passage fluidly connecting the main chamber and the auxiliary chamber, an electrorheopetic fluid filling the main chamber and the auxiliary chamber, and a plurality of electrodes disposed in the orifice passage, the viscosity of the electrorheopetic fluid in the orifice passage depending upon the voltage applied to the electrodes;
    a voltage supply connected to the electrodes and having a plurality of different voltage levels; and
    control means responsive to the switch for simultaneously changing the voltage level of the voltage supply when the setting of the switch is changed.

* * * * *